United States Patent [19]

Arff et al.

[11] Patent Number: 5,421,657
[45] Date of Patent: Jun. 6, 1995

[54] APPARATUS FOR PRELOADING A TORQUE CONVERTER THRUST BEARING

[75] Inventors: Dwayne E. Arff; Barrett A. Flinn, both of Peoria; Wallace A. Lelm, Washington, all of Ill.

[73] Assignee: Caterpillar Inc., Peoria, Ill.

[21] Appl. No.: 122,873

[22] Filed: Sep. 16, 1993

[51] Int. Cl.6 .............................................. F16C 19/10
[52] U.S. Cl. ...................................... 384/620; 384/906
[58] Field of Search ............... 384/620, 611, 563, 518, 384/906

[56] References Cited

U.S. PATENT DOCUMENTS

| | | | |
|---|---|---|---|
| 4,913,564 | 4/1990 | Stephan et al. | 384/518 |
| 5,261,750 | 11/1993 | Eckhardt et al. | 384/620 |
| 5,316,393 | 5/1994 | Daugherty | 384/518 |

*Primary Examiner*—Lenard A. Footland
*Attorney, Agent, or Firm*—O. Gordon Pence

[57] ABSTRACT

Apparatus is disclosed for preloading a thrust bearing disposed for carrying axial loads between a first member and a second member of a torque converter that are rotatable relative to each other about a central axis. The apparatus includes a first race assembly carried by the first member and disposed on one side of the thrust bearing. The first race assembly includes a fixed race having a radial bearing surface adapted to engage the bearing. A second race assembly is carried on the second member and is disposed on the other side of the thrust bearing. The second race assembly includes a floating race, a support ring, and a plurality of coil springs. The support ring has an annual groove with a bottom face disposed toward the thrust bearing and a plurality of apertures opening into the bottom face. The groove is adapted to receive the floating race and the apertures are adapted to receive the coil springs. The coil springs are adapted to urge the flowing race toward and maintain the race in engagement against the thrust bearing.

6 Claims, 3 Drawing Sheets

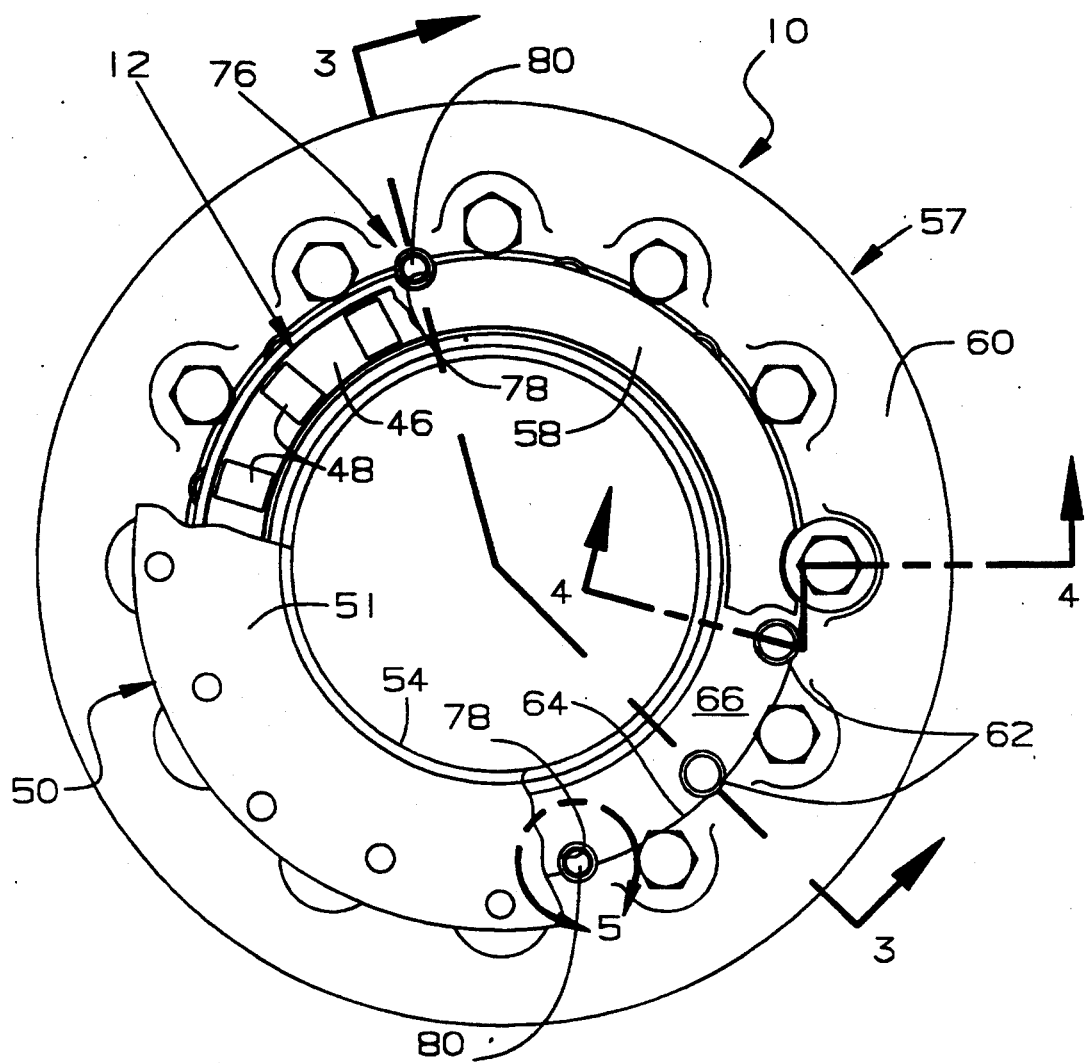
Fig_2_

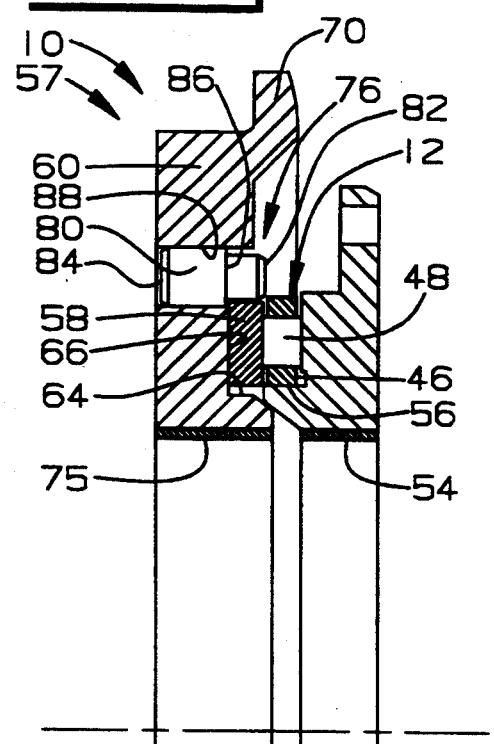
Fig_3_
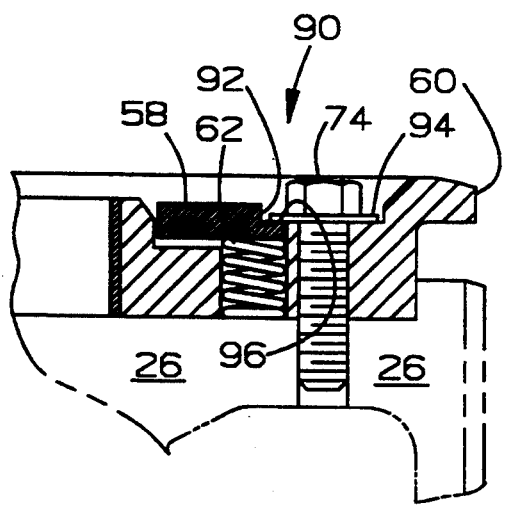
Fig_4_
Fig_5_
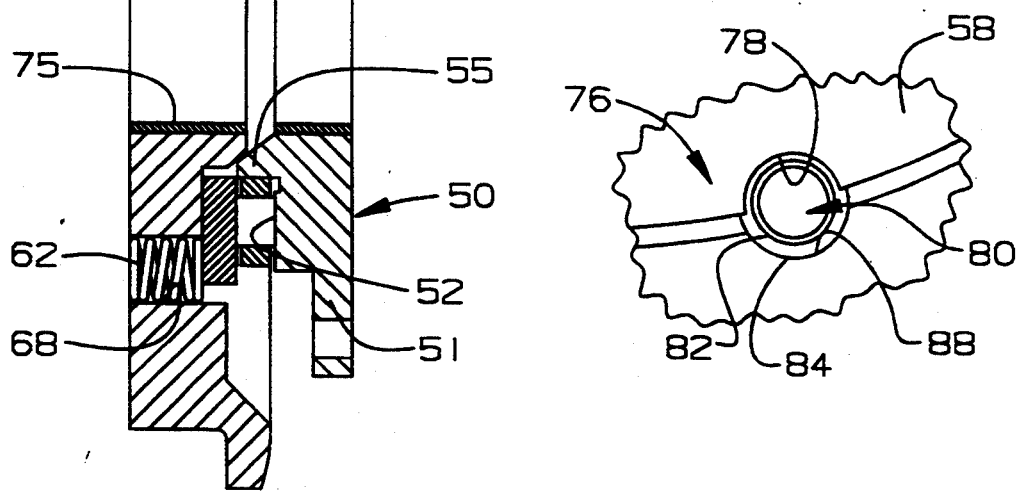

APPARATUS FOR PRELOADING A TORQUE CONVERTER THRUST BEARING

TECHNICAL FIELD

The present invention relates to thrust bearings employed in very large torque converters and, more particularly, to apparatus for preloading such thrust bearings to maintain the bearing rollers in contact with the races at all times during operation.

BACKGROUND ART

Torque converters commonly employ thrust bearings between the impeller and stator and turbine and stator blades to carry the axial components of force produced between such torque producing blades of the converters.

Thrust bearings commonly employ a roller cage that is made either from stamped or formed steel or from solid bronze. The formed steel cage has the advantage of being much cheaper and much lighter than the bronze cage. The bronze cage, on the other hand, is stronger than the steel cage.

In very large torque converters used in large earthmoving vehicles, such as off-highway mining trucks and wheel loaders, manufacturing tolerances increase dramatically. As a consequence, it is difficult to prevent a significant amount of end play between the torque converter components. When the axial forces diverge from the thrust bearing, the end play can allow the thrust bearing rollers to become unloaded. As a consequence, the rollers are not maintained in sufficient contact with its relatively rotating races to maintain the speed of the thrust bearing with that of the races. This, in turn, allows the roller and cage to slow down or lag behind the speed of the races when the bearing rollers are unloaded. During operation, however, the axial forces can abruptly change directions, such as during downhill down shifts or when reversing vehicle directions under load. When this occurs, the thrust bearing becomes instantaneously loaded and must accelerate up to the speed of the races. As a consequence, acceleration forces are produced on the rollers, which in turn, are transmitted to the roller cage. Such acceleration forces are sufficiently high in the very large thrust bearings used in large torque converters due to their greater mass that it causes the premature failure of the steel bearing cages due to fatigue. On the other hand, if a stronger bronze bearing cage is used instead of a steel cage, the much greater mass of the bronze cage is sufficient to slow the acceleration of rollers and cage to cause roller skidding on the races. Such skidding produces flat spotting on the rollers and excessive wear on the races, also resulting in premature bearing failure, along with expensive down time of the vehicle and repair costs.

The present invention is directed toward eliminating the above-noted bearing failure problems.

DISCLOSURE OF THE INVENTION

In accordance with one aspect of the present invention, apparatus is provided for preloading a thrust bearing disposed for carrying axial loads between a first member and a second member of a torque converter that are rotatable relative to each other about a central axis. The apparatus includes a first race assembly carried by the first member and disposed on one side of the thrust bearing. The first race assembly includes a fixed race adapted to engage the bearing. A second race assembly is carried on the second member and is disposed on the other side of the thrust bearing. The second race assembly includes a floating race, a support ring, and a plurality of coil springs. The support ring has an annual groove with a bottom face disposed toward the thrust bearing and a plurality of apertures opening into the bottom face. The groove is adapted to receive the floating race and the apertures are adapted to receive the coil springs. The coil springs are adapted to urge the flowing race toward and maintain the race in engagement against the thrust bearing.

BRIEF DESCRIPTION OF THE DRAWINGS

FIG. 2 is a front elevational view, taken generally along line II—II of FIG. 1, of the preloading apparatus and thrust bearing with portions broken away to shown underlying features of the present invention;

FIG. 3 is an enlarged cross-sectional view of the preloading apparatus and thrust bearing taken along line III—III of FIG. 2 and illustrating a dowel pin employed for preventing rotation of the floating race and one of the coil springs for urging the floating race against the thrust bearing;

FIG. 4 is a fragmentary cross-sectional view taken along line IV—IV of FIG. 2 illustrating means for retaining the floating race during assembly of the apparatus; and FIG. 5 is an enlarged fragmentary elevational view of line 5 of FIG. 2 further illustrating the dowel pin.

BEST MODE FOR CARRYING OUT THE INVENTION

Figure 1:
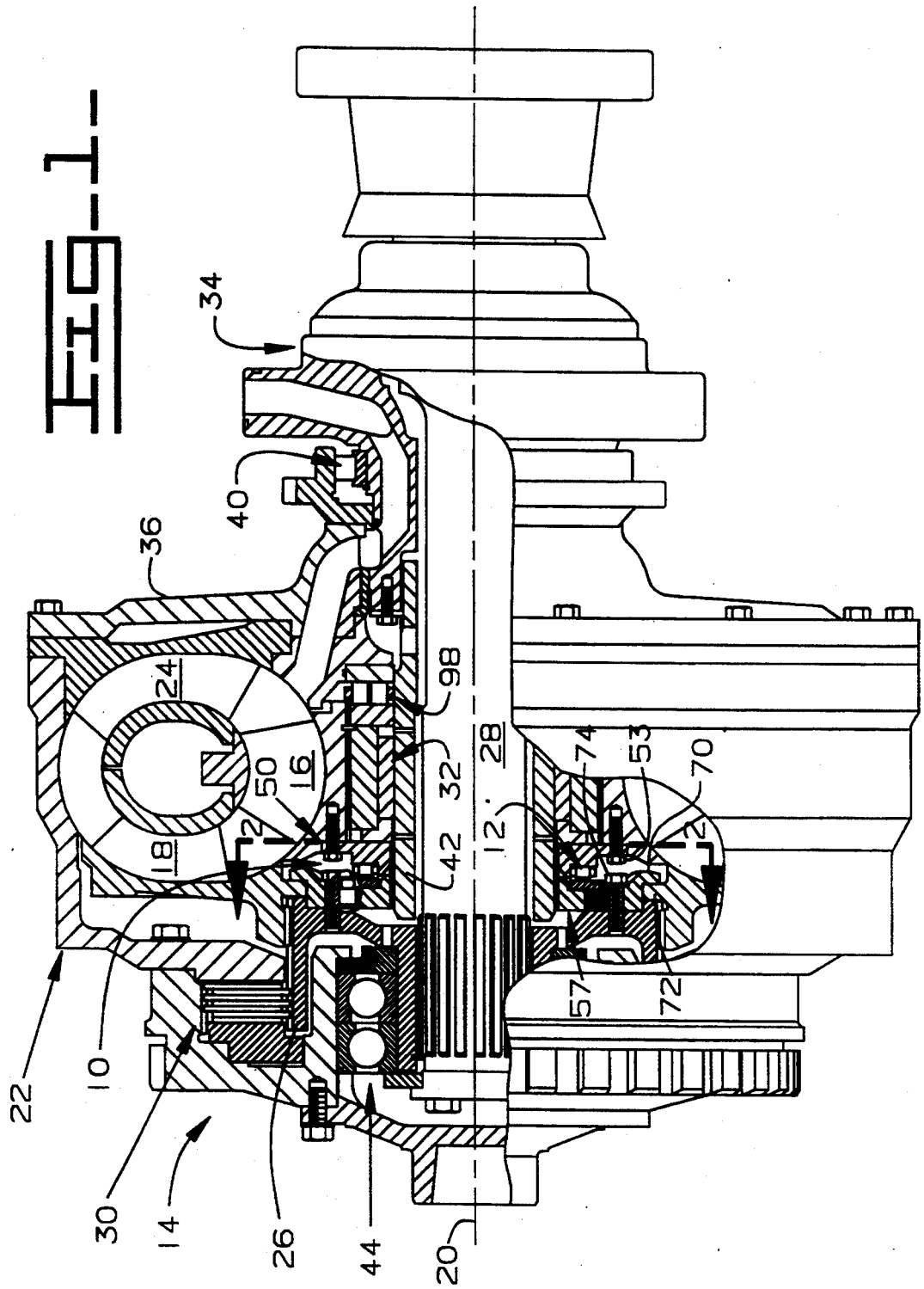
FIG. 1 is a side elevational view of a torque converter with portions broken away and shown in section to illustrate apparatus embodying the principles of the present invention for preloading a thrust bearing of such torque converter.

Referring more particularly to the drawings, apparatus embodying the principles of the present invention is generally depicted by reference numeral 10 in FIG. 1 for pre-loading a torque converter thrust bearing 12. Thrust bearing 12 is employed in a torque converter 14 for carrying axial forces between a first member 16 and a second member 18 of such torque converter that are rotatable relative to each other about a central axis 20. As illustrated in FIG. 1, the first member 16 is a stator and the second member 18 is a turbine.

For purposes of the present invention, the torque converter 14 may be of any well known construction. It should therefore be understood that the following description of the torque converter 14 and the construction thereof depicted in FIG. 1 is only for illustrative purposes to aid in the understanding the present invention and is not intended to limit the present invention, as other well known torque converter constructions may be employed as well, as those skilled in the art will appreciate. With this in mind, the torque converter 14, as shown in FIG. 1, has an externally splined, multi-part housing 22, which is typically coupled to the flywheel of an engine (not shown). The housing 22, in turn, is connected to a third member or impeller 24, which is also rotatable relative to the stator 16 about the central axis 20. Through reaction with fluid in the torque converter, power is transmitted from the impeller 24 to the turbine 18 and from the turbine 18 to the stator 16 of the torque converter 14 in the usual manner. The turbine 18 is splined to a hub 26, which in turn, is splined to an output shaft 28. Output shaft 28, as is the customary practice, is coupled to a transmission (also not shown).

The torque converter 14 illustrated is also provided with a lock-up clutch 30. When engaged, the lock-up clutch 30 connects the housing 22 to the hub 26, thus allowing power to be transmitted directly to the output shaft 28. Lock-up clutches are commonly employed to increase efficiency when power flow through the torque converter 14 is not required. The torque converter 14 may also employ a one-way free wheeling mechanism, illustrated at 32, to permit the rotation of the stator while the lock-up clutch is engaged.

The torque converter 14 also includes a stator carrier 34. The impeller 24 is mounted to a flange 36 that is, in turn, rotatably mounted to the stator carrier 34 by means of a suitable bearing 40. A cylindrical race 42 is disposed about the output shaft 28 and is also mounted to the stationary housing 34. Race 42 supports the free wheeling mechanism 32 that, in turn, supports the stator 16. At the left end of the torque converter, the rotatable housing 22 is rotatably mounted to the hub 26 by a pair of suitable bearings 44.

As mentioned earlier, the thrust bearing 12 is employed in a torque converter 14 for carrying axial forces between the stator 16 and the turbine 18. As best shown in FIGS. 2 and 3, such thrust bearing 12 preferably includes a bronze bearing cage 46. The cage is adapted to support a plurality of bearing rollers 48 in a uniformly spaced radial orientation about the central axis 20.

The apparatus 10 of the present invention includes a first race assembly 50 carried by the first member or stator 16 and disposed on one side of the thrust bearing 12. The first race assembly 50 includes a fixed race 51 having a radial bearing surface 52 adapted to engage the rollers 48 of bearing 12. The first race assembly 50 is mounted to the stator by a plurality of bolts 53 and includes an inner sleeve bearing 54 for rotatably supporting the fixed race 51 about the cylindrical race 42. The fixed race 51 is also preferably provided with a pilot hub 55 extending therefrom under the thrust bearing 12. The pilot hub 55 is adapted to fit into an inner diameter 56 of the bearing cage 46 to support the thrust bearing 12 during assembly into the torque converter 14.

A second race assembly 57 is carried by the second member or turbine 18 and is disposed on the other side of the thrust bearing 12. The second race assembly 57 includes a floating race 58, a support ring 60, and a plurality of coil springs 62. The support ring 60 has an annular groove 64 with a bottom face 66 disposed toward the thrust bearing 12 and a plurality of apertures 68 opening into the bottom face 66. The groove 64 is adapted to loosely receive the race 58 and the apertures 68 are adapted to loosely receive the coil springs 62. The coil springs 62 are of sufficient length and capacity to urge the floating race 58 toward and maintain the race in engagement against the rollers 48 of thrust bearing 12 during all conditions in the operation of the torque converter 14. Also, the support ring 60 has a radially outwardly extending flange 70, which engages a radially inwardly extending flange 72 (FIG. 1) on the turbine 18. The flange 72 of the turbine is, in effect, clamped between the flange 70 of the support ring 60 and the hub 26 when the support ring 60 is attached to the hub by means of bolts 74. The second race assembly 57 also includes an inner sleeve bearing 75 for rotatably supporting the support ring 60 about the cylindrical race 42.

As best seen in FIGS. 3 and 5, the preloading apparatus 10 also includes means 76 for preventing the rotation of the floating race 58 relative to the support ring 60 of the second race assembly 57. Such means 76 includes at least one notch 78 formed in the periphery of the floating race 58 and at least one dowel pin 80 carried by support ring 60. The pin 80 is adapted to engage the notch 78 to prevent rotation of the race 58 while permitting free axial movement of the race. As best shown in FIG. 2, means 76 preferably includes two of such notches 78 and pins 80, which are oriented 180 degrees apart in the race 58 and the support ring 60, respectively. Preferably, each pin 80 is of a stepped construction, with a reduced end portion 82 engaging the notch 78 and an enlarged end portion 84 providing a shoulder 86 therebetween. The enlarged end portion 84 is press-fitted into suitable apertures 88 provided in the support ring 60. The shoulder 86 will advantageously engage the race 58 in the event the pin 80 becomes loose and prevents the pin 80 from falling out the aperture 88 during operation and damaging the torque converter 14.

As shown in FIG. 4, the apparatus 10 also preferably includes means 90 for retaining the floating race 58 to the support ring 60 during assembly. Such retaining means 90 includes a pair of arcuate blind pockets 92 formed in the periphery of the floating race 58 and opening toward the thrust bearing 12. The pockets 92 are adapted to receive the periphery of a large washer 94. Each of the washers 94 is preferably retained against the support ring 60 by one of the bolts 74 used to retain the support ring 60 to the hub 26. The bolts 74 are conveniently positioned at a location adjacent to the periphery of the race 58. The pockets 92 each have a bottom surface 96 disposed at a predetermined axial location relative to its respective washer 94 in order to engaged the washer during assembly by the force of the springs 62, but to be clear of the washer 94 after assembly so that the washers do not interfere with the axial movement of the race 58 into engagement with the rollers 48 of thrust bearing 12 during operation.

The torque converter 14 also typically includes a second thrust bearing 98 (FIG. 1), which is disposed between the stator 16 and the impeller 24. Such second thrust bearing is shown without the thrust bearing pre-loading apparatus 10 of the present invention that has been herein described for the first thrust bearing 12. However, those skilled in the art will recognize the pre-loading apparatus could be employed with such second thrust bearing 98 as well.

INDUSTRIAL APPLICABILITY

In prior very large torque converters, similar to the torque converter 14 depicted in FIG. 1, a sufficient amount of end play exists to allow the thrust bearing 12 between the stator 16 and the turbine 18 to become unloaded when axial thrust loads are in one direction and become abruptly loaded when such forces reverse directions. Such abrupt reversals are common in torque converter operation and can occur frequently, depending upon vehicle applications. For example, abrupt reversals may occur when a vehicle, such as a large off-highway mining truck, is down shifted to slow the vehicle as it goes down a steep downgrade. Another example would be when a vehicle, such as a large wheel loader, is shifted into reverse while it is still moving forward. This occurs quite frequently when such a wheel loader is being used to pick up material from a stock pile or the like and then backs up to dump the material into a waiting truck.

An unloaded thrust bearing may slow to a speed that is less than the speed necessary to match its bearing races, because of not being in constant contact with the races. When the thrust bearing becomes abruptly loaded due to a reversal of the thrust loads in the torque converter, the thrust bearing must accelerate up to a speed to match the speed of the races. In larger thrust bearings, in particular, the mass of the rollers and cage is sufficient to either limit the acceleration of the thrust bearing, causing the rollers to skid, or produce efficient acceleration forces to cause fatigue failures in the bearing cage. Those skilled in the art will appreciate that roller skidding will cause flat spotting of the rollers and excessive wear on the races.

The present thrust bearing preloading apparatus 10 is effective in eliminating these types of bearing failures by maintaining the races 51 and 58 in continuous engagement with the thrust bearing rollers 48, thus ensuring that the rollers 48 are always at an appropriate speed to match the speed of the races 51,58. As a consequence, any abrupt change in the direction of the thrust forces does not produce acceleration forces in the thrust bearing 12.

This is accomplished by the construction of the present apparatus 10, wherein a multiplicity of coil springs 62 are employed to uniformly preload a floating race 58 with a significant force sufficient to maintain the race 58 in continuous contact with the bearing rollers 48 and to maintain the rollers 48 in continuous contact with the fixed race 51 on the other side of the thrust bearing 12 as well.

The apparatus 10 includes means 76 for preventing the rotation of the floating race 58 relative to its race support ring 60, as such rotation would allow frictional wear of the race and the support ring to occur. Such rotation is advantageously and effectively prevented by the use of a pair of dowel pins 80 that extend from the support ring 60 into engagement with a like pair of notches 78 provided in the periphery of the floating race 58.

The construction of the present apparatus 10 also effectively aids in the assembly of the apparatus 10 and the thrust bearing 12. First, the retaining means 90 ensures that the floating race 58 is maintained in its proper position during assembly and allows the blind assembly of the thrust bearing 12 against the floating race 58. The thrust bearing 12, itself, is maintained in proper assembly position by its mounting on the pilot hub 55 provided on the fixed race 51.

Other aspects, objects and advantages of this invention can be obtained from a study of the drawings, the disclosure and the appended claims.

We claim:

1. Apparatus for pre-loading a thrust bearing disposed for carrying axial loads between a first member and a second member of a torque converter that are rotatable relative to each other about a central axis, comprising:
   a first race assembly carried by said first member and disposed on one side of said trust bearing, said first race assembly including a fixed race adapted to engage said bearing;
   a second race assembly carried by said second member and disposed on the other side of said trust bearing, said second race assembly including a floating race, a support ring, and a plurality of coil springs, said support ring having an annualar groove with a bottom face disposed toward said thrust bearing and a plurality of apertures opening into the bottom face, said groove being adapted to receive said floating race and said apertures being adapted to receive said coil springs, said coil springs being adapted to urge said floating race toward and maintain said race in engagement against said thrust bearing; and
   means for retaining said floating race to said support ring during assembly.

2. The apparatus of claim 1, wherein said retaining means includes:
   a pair of arcuate pockets formed in the periphery of said floating race and opening toward said trust bearing, said pockets being adapted to receive the periphery of a large washer, said washer being retained against said support member at a location adjacent to the periphery of said race, said pocket having a bottom surface disposed at a predetermined axial location relative to said washer to engaged said washer during assembly by the force of said springs, but to be clear of said washers after assembly so as said washer does not interfere with the axial movement of said race into engagement with said thrust bearing during operation.

3. The apparatus of claim 2, wherein said trust bearing includes:
   a plurality of rollers and a bearing cage, said cage being adapted to support said rollers in a uniformly spaced radial orientation about said central axis.

4. The apparatus of claim 3, wherein said bearing cage has an inner diameter and said support ring of said first race assembly includes a pilot hub extending therefrom under said thrust bearing, said pilot hub being adapted to fit into the inner diameter of said bearing cage to support said thrust bearing during assembly.

5. The apparatus of claim 1, wherein said first member of said torque converter is a stator and said second member is a turbine.

6. Apparatus for pre-loading a thrust bearing disposed for carrying axial loads between a first member and a second member of a torque converter that are rotatable relative to each other about a central axis, comprising;
   a first race assembly carried by said first member and disposed on one side of said trust bearing, said first race assembly including a fixed race adapted to engage said bearing;
   a second race assembly carried by said second member and disposed on the other side of said trust bearing, said second race assembly including a floating race, a support ring, and a plurality of coil springs, said support ring having an annular groove with a bottom face disposed toward said thrust bearing and a plurality of apertures opening into the bottom face, said groove being adapted to receive said floating race and said apertures being adapted to receive said coil springs, said coil springs being adapted to urge said floating race toward and maintain said race in engagement against said thrust bearing; and
   means for preventing the rotation of said floating race relative to the support ring of said second race assembly, said means include at least one notch formed in the periphing of said floating race and at least one dowel pin carried by said support ring, said pin being adapted to engage said notch to prevent rotation of said race while permitting face axial movement of said race.

* * * * *